United States Patent
Patwardhan et al.

(10) Patent No.: US 10,929,423 B1
(45) Date of Patent: Feb. 23, 2021

(54) SYSTEM AND METHOD FOR EFFICIENT EPISODIC REPLICATION OF DATA TO CLOUD STORAGE

(71) Applicant: EMC Corporation, Hopkinton, MA (US)

(72) Inventors: Kedar Patwardhan, Irvine, CA (US); Peter Chen, Irvine, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1182 days.

(21) Appl. No.: 15/196,521

(22) Filed: Jun. 29, 2016

(51) Int. Cl.
*G06F 16/27* (2019.01)

(52) U.S. Cl.
CPC .................. *G06F 16/27* (2019.01)

(58) Field of Classification Search
CPC ...... G06F 16/122; G06F 16/23; G06F 16/248; G06F 16/27; G06F 16/1744; G06F 16/24561
USPC ................................. 707/645, 646
See application file for complete search history.

(56) References Cited

U.S. PATENT DOCUMENTS

| | | | | |
|---|---|---|---|---|
| 8,631,052 B1* | 1/2014 | Shilane | ............... | G06F 16/1748 707/825 |
| 8,775,377 B1* | 7/2014 | Zhang | ..................... | G06F 17/00 707/640 |
| 8,930,648 B1* | 1/2015 | Storer | ................. | G06F 12/0292 711/154 |
| 9,268,648 B1* | 2/2016 | Barash | ................ | G06F 11/1471 |
| 9,367,557 B1* | 6/2016 | Lin | ..................... | G06F 16/1744 |
| 2008/0133561 A1* | 6/2008 | Dubnicki | ............ | G06F 11/1453 |
| 2009/0013129 A1* | 1/2009 | Bondurant | ........... | G06F 3/0608 711/115 |
| 2010/0332401 A1* | 12/2010 | Prahlad | ............... | H04L 63/0428 705/80 |
| 2011/0167221 A1* | 7/2011 | Pangal | ................ | G06F 11/1453 711/117 |
| 2015/0012698 A1* | 1/2015 | Bolla | .................. | G06F 12/0866 711/113 |

* cited by examiner

*Primary Examiner* — James Trujillo
*Assistant Examiner* — Fariborz Khoshnoodi
(74) *Attorney, Agent, or Firm* — Workman Nydegger

(57) ABSTRACT

In one example, a method managing data includes transmitting backup format information to a storage platform, breaking data targeted for backup into data pieces, computing a unique fingerprint for each of the data pieces, and transmitting metadata concerning the data pieces to the storage platform, where the metadata includes the fingerprints. The method further includes receiving from the storage platform a list of any new fingerprints that do not correspond to any of the data pieces, and grouping data pieces together to form a jumbo data piece, where the data pieces that form the jumbo data piece are data pieces to which the new fingerprints correspond.

20 Claims, 4 Drawing Sheets

SYSTEM AND METHOD FOR EFFICIENT EPISODIC REPLICATION OF DATA TO CLOUD STORAGE

FIELD OF THE INVENTION

Embodiments of the present invention generally concern backup and restoration of data, and the management of backed up data. More particularly, at least some embodiments of the invention relate to systems, hardware, computer-readable media, and methods directed to replicating backups to a storage platform, such as a cloud storage platform.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was lost or compromised, and then restore that data to one or more locations, machines and/or environments.

While there is little question about the need to back up important data, the ongoing accumulation of data, such as by an enterprise for example, can result in the transmission and storage of a vast amount of data. As well, on-premises systems are often inadequate to handle this volume of data, and may not have sufficiently robust security systems. Moreover, on-premises backup storage systems may be vulnerable to natural disasters and other occurrences. In view of considerations such as these, many enterprises have chosen to move their backup storage offsite, such as to a cloud storage platform for example. However, while cloud storage platforms have proven useful in a variety of ways, problems nonetheless remain.

For example, some enterprises perform initial processing of backup data locally, or on-premises. This initial processing can involve breaking up on-premises data into chunks and then uploading the chunks to the cloud storage in a de-duplicated format. The on-premises systems and devices that perform these processes essentially act as cloud storage gateways and transform data from an on-premises form of representation to an object/chunk representation on cloud storage.

More particularly, such cloud storage gateways create new metadata that indicates how the on-premises representation of data was chunked into pieces, and that also indicates the way each chunk can be accessed in the cloud storage. This metadata must be replicated to the cloud storage, along with all of the individual chunks. Even if the data is deduplicated before being uploaded to cloud storage however, a significant amount of data and information may still be required to be uploaded. An example may help illustrate some of the problems.

By way of illustration, if a backup consisted of about 1 TB worth of logical data broken into chunks having a size of about 12 KB each, there would be around 89 million chunks, and also about 89 million fingerprints, one for each chunk. As well, there would be chunk-grouping-metadata that lists the order of grouping together with the 89 million chunks to be able to return the stored data back to its on-premises format, such as a backup data file. In order to replicate the backup to cloud storage, the cloud storage gateway needs to store both the individual chunks, as well as the chunk-grouping-metadata to cloud storage. Thus, the chunk-grouping-metadata would have to store at a bare minimum, the logical offset of a chunk (8 bytes) and the fingerprint of the chunk (22 bytes) for each of the chunks. This results in a total storage requirement, in the cloud storage, of about 2.6 GB of information for a 1 TB logical sized backup. Even assuming that of the 89 million chunks, about 90% are already stored in the cloud storage, such as from a previous backup, about 8.9 million chunks would still have to be sent to the cloud storage platform.

As will be apparent from this example, use of a cloud storage gateway to chunk backup data and store de-duplicated chunks to cloud storage can result in significant overheads. As, in the example above, replicating a 1 Tbyte backup, which differs in size by only about 10% from its previous backup, requires sending across some 9 million chunks from the enterprise premises to the cloud storage platform. Transmission time for this amount of data would be significant. In particular, sending the changed data chunks, that is, 9 million objects of around 12 kbytes each, as a single packet (chunk) would take around 184 minutes over a 100 mbps network or just 18 minutes over a 1 Gbps network.

A related problem is that unless and until the chunk-grouping-metadata has also been replicated to cloud storage, the chunks by themselves may have little or no value to the enterprise. For example, a disaster that destroys a cloud storage gateway before the chunk-grouping-metadata could be replicated to cloud storage renders the chunks useless.

Another problem with current systems and configurations is that identifying chunks unique to a particular backup, and then replicating the unique chunks to cloud storage, is a time consuming process. To illustrate, before sending a chunk from the enterprise premises to the cloud storage platform, a secure socket connection must be established by the enterprise premises with the cloud storage. This requires setting up an IP, TCP and a https connection between the on-premises cloud storage gateway and the cloud storage provider. Assuming, for example, that the cloud storage gateway opens 100 connections simultaneously, and also uses http pipelining to send multiple (10) chunks to the cloud storage provider, we still end up with 9437 https session establishment requests to the cloud storage provider. Depending upon the extent of latency between the on-premises cloud storage gateway and the cloud storage provider, these requests can take anywhere from about 31 minutes (assuming, for example, a 220 ms session establishment time) or more just to establish the https transport connection.

Finally, the overhead involved with establishing several https connection requests with the cloud storage service provider can be quite significant. Increasing network throughput speeds would significantly reduce time taken to send the unique chunks to cloud storage, but would reduce the https connection request time by a lesser extent as the latter is more a function of network latency than network throughput.

In light of problems such as those noted above, and/or others, it would be useful to be able to eliminate a cloud storage gateway as a single point of failure. It would also be useful to improve the scalability of data replication from on-premises to a cloud storage arrangement. As well, it would be useful to be able to avoid the need to open multiple SSL socket connections between an enterprise premises and cloud storage platform. Finally, it would be useful to avoid, or at least reduce, any undesirable effects imposed by latency.

DESCRIPTION OF THE FIGURES

In order to describe the manner in which at least some aspects of this disclosure can be obtained, a more particular description will be rendered by reference to specific embodiments thereof, which are illustrated, in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
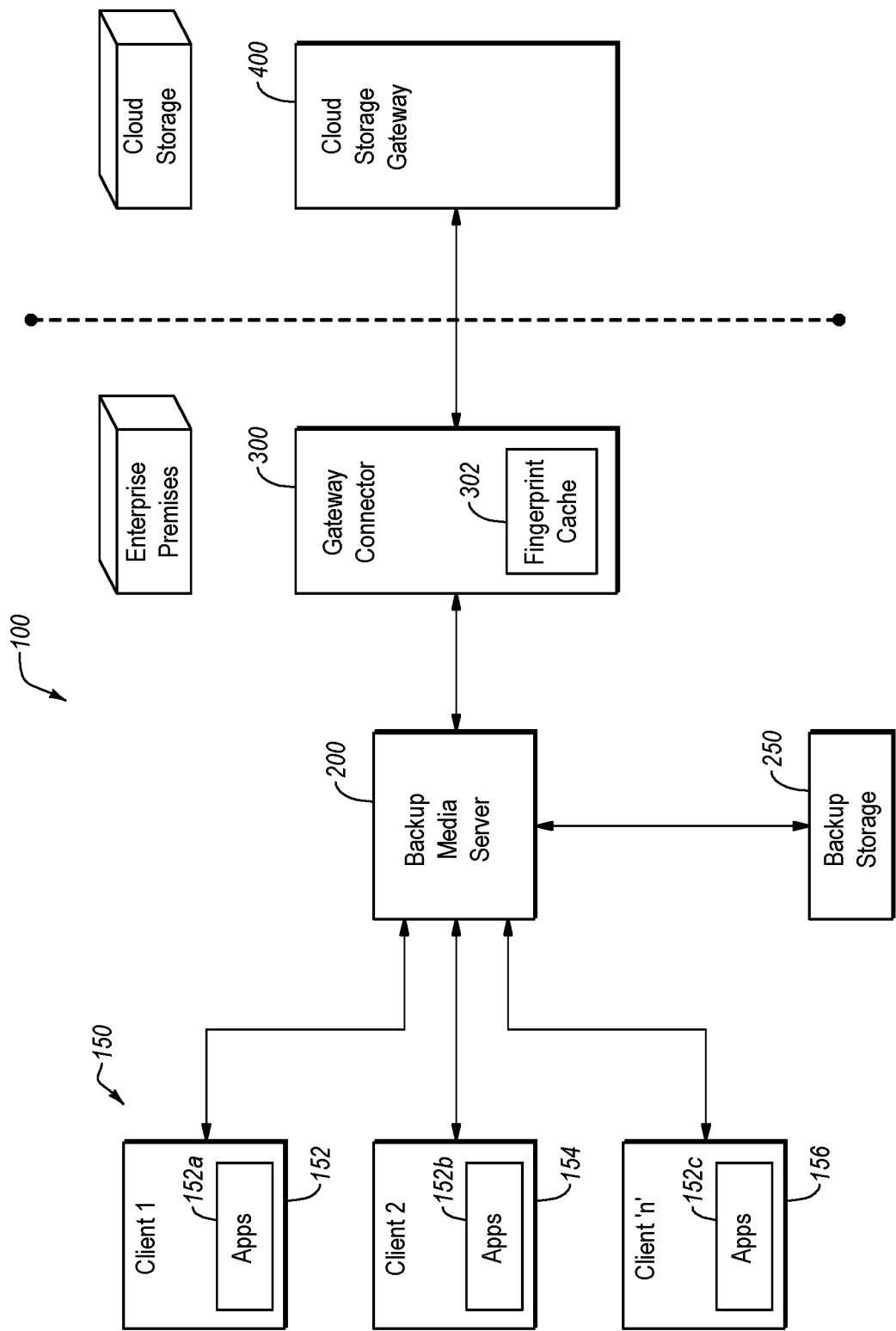
FIG. 1 is directed to aspects of a first example operating environment for at least some embodiments.

Embodiments of the present invention generally concern backup and restoration of data, and the management of backed up data. More particularly, at least some embodiments of the invention relate to systems, hardware, computer-readable media, and methods directed to replicating backups to a storage platform, such as a cloud storage platform for example.

Embodiments of the invention can be employed, for example, in connection with backup data targeted for storage, and in connection with backup data that has already been stored. In some cases, embodiments of the invention are implemented in connection with a cloud storage environment, although that is not required and other embodiments can be employed in association with any other storage environment.

Embodiments of the invention can be employed in connection with any type or form of data. As used herein, the terms 'data' and 'data element' are intended to be construed broadly and embrace, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data. Likewise, the term 'metadata' as used herein is intended to be broad in scope and embraces, at least, any information about any of the types of data disclosed herein. Examples of metadata include, but are not limited to, information about a data element such as the version, creation date, and expiration date.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection and later restoration.

In connection with the examples noted immediately below, as well as the examples disclosed elsewhere herein, it should be noted that the use of the term 'object' is employed simply as a convenient way to illustrate aspects of embodiments of the invention. However, the scope of the invention is not limited to the use of objects nor to any other particular form, group, set, combination or string, of data or data element.

In at least some embodiments of the invention, a cloud storage gateway, which can also be referred to herein simply as a cloud gateway, is located within the cloud storage provider premises. The cloud storage gateway can take various forms, such an on-demand compute, or can take the form a service provided by the cloud storage provider. Further, a gateway-connector device is also employed that may be used to take the place, for example, of an on-premises cloud storage gateway. In some implementations at least, the gateway connector is a thin device that helps to optimize transfer of chunks to cloud storage.

In more detail, the gateway-connector can take the form of a service that runs on-premises at the enterprise, and acts as a liaison between the local backup media server and the cloud storage gateway. The gateway-connector and the cloud storage gateway both have knowledge of the backup format that is being replicated to cloud. Some example backup formats that can be employed in connection with embodiments of the invention include, but are not limited to, a file system backup format, and a block image format. In operation, the gateway connector communicates the format of the backup that is about to be replicated to the cloud storage gateway before sending over the backup data. The cloud storage gateway can then adjust its behavior according to the backup format information that is received from the gateway connector concerning the data that will be replicated to the cloud.

Advantageously then, embodiments of the invention may avoid the need for multiple https connection requests from the enterprise premises to the cloud storage provider. As well, metadata can be maintained in cloud storage to aid in disaster recovery preparedness, and this storage of the metadata can also reduce the amount of time needed to perform a backup to the cloud storage. Finally, embodiments of the invention are configured in such a way that the gateway-connector is not a single point of failure, thus enhancing the reliability and availability of the overall backup system.

A. Example Operating Environment

In general, embodiments of the invention may include and/or be implemented in an operating environment that includes various clients and/or other devices that generate and/or cause the generation of data that is backed up by a cloud storage provider at a cloud storage site. In at least some embodiments of the invention, any of the methods disclosed herein can be performed in whole or in part at a cloud storage site and/or an enterprise premises, although that is not necessarily required. In some instances, certain portions of a method are performed at a cloud storage site, while other portions of that method are performed at an enterprise premises. The allocations of functionalities between an enterprise premises and cloud storage site disclosed herein are presented by way of example only and, more generally, such functionalities can be distributed in any other suitable manner.

As used herein, the term 'client' is intended to have broad scope and embraces, among other things, any system, device, or combination of those, by way of which access, whether direct or indirect, to cloud based storage can be achieved. As such, one or more clients may be in a cloud system, and/or one or more clients may be located at a customer site.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. Moreover, the operating environment 100, or any group of one or more of its elements, may comprise, form an element of, or constitute, a cloud computing environment. In other embodiments, some, or all, of the elements of the operating environment 100 can reside on-premises at an enterprise. The operating environment 100 may include various devices including servers and other computers that are interconnected. The operating environment 100 may employ a variety of communication media, such as hardwire, optical, wireless, or some combination thereof. Unless otherwise indicated, communication between entities shown as connected can be unidirectional, or bidirectional.

As indicated in FIG. 1, the example operating environment 100 may include one or more clients 150, such as clients 152, 154, and 156 for example. Among other things, the clients 150 may host, or otherwise employ, one or more applications, such as application groups 152a, 152b, and 152c, respectively. These applications, which can be any type of application, may generate, and/or cause the generation of, data and associated metadata that is desired to be stored, such as in the form of a backup for example, and that can be used to restore data to the clients 150. One of the applications on one or more of the clients 150 may be a backup client that can cooperate with a backup application on a backup media server 200 to generate one or more backups of data and metadata of the client(s) 150 for storage and subsequent restoration. Examples of such backup media servers include, but are not limited to, the EMC Avamar server, and the EMC NetWorker server.

The backup media server 200 may reside on-premises with the clients 150, although that is not required. As well, the backup media server 200 can communicate with, or include, backup storage 250. In general, the backup storage 250 enables local, or on-premises, storage of backups of the clients 150.

The example operating environment 100 further includes a gateway connector 300 that can reside on-premises at the enterprise, and which may include a fingerprint cache 302. In general, the gateway connector 300 performs processing relating to the transfer of data chunks and associated metadata from the enterprise premises to a cloud storage platform by way of a cloud storage gateway 400. In some implementations at least, the gateway connector 300 is a thin device that helps to optimize transfer of chunks and associated metadata to cloud storage. As used herein, a 'thin' device refers to a device that is capable of performing various processes concerning data and/or metadata that is targeted for storage at a cloud storage platform but which stores little, or no, data or metadata locally. As well, any data or metadata that may be stored at the thin device is stored only briefly, such as in RAM for example, and is not stored persistently.

In more detail, and as noted earlier herein, the gateway connector 300 can take the form of a service that runs on-premises at the enterprise, and acts as a liaison between the local backup media server 200 and the cloud storage gateway 400. The gateway connector 300 and the cloud storage gateway 400 both have knowledge of the backup format that is being replicated from the enterprise premises to the cloud storage environment. Some example backup formats that can be employed in connection with embodiments of the invention include, but are not limited to, a file system backup format, and a block image format. In operation, and as discussed in more detail elsewhere herein, the gateway connector 300 communicates the format of the backup that is about to be replicated to the cloud storage gateway 400 before sending over the backup data. The cloud storage gateway 400 can then adjust its behavior according to the backup format information that is received from the gateway connector 300 concerning the data that will be replicated to the cloud storage platform.

With continued reference to FIG. 1, the cloud storage gateway 400 can reside at the cloud storage environment and can take various forms. For example, the cloud storage gateway 400 can take the form of an on-demand compute process, or can take the form of a service provided by the cloud storage provider. Still other embodiments of the cloud storage gateway 400 can comprise a combination of one or more on-demand compute processes, and one or more services. The scope of the invention is not limited to any particular cloud gateway configuration.

B. Example Host Configuration

Figure 2:
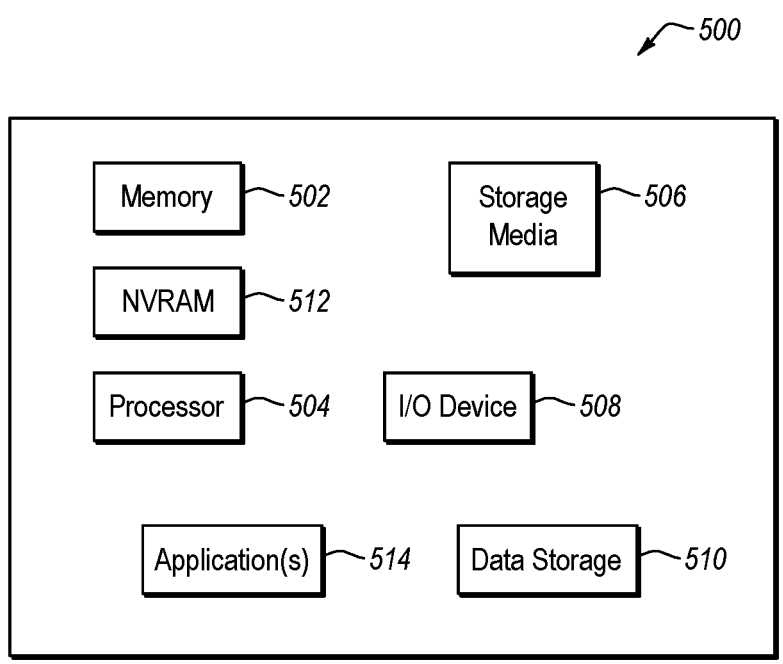
FIG. 2 is directed to an example computing device that may be employed in connection with some embodiments of the invention.

With reference briefly to FIG. 2, the backup media functionality, backup storage functionality, gateway connector, and/or cloud storage gateway, and services disclosed herein, can be hosted on respective servers. In some instances, two or more of these may be hosted on a common server. In any case, such servers can consist of, comprise, or take the form of, one or more physical computing devices, one example of which is denoted at 500 in FIG. 2. In the example of FIG. 2, the computing device 500 includes a memory 502, one or more hardware processors 504, non-transitory storage media 506, I/O device 508, data storage 510, and NVRAM 512. As well, one or more applications 514 are provided that comprise executable instructions. Such executable instructions can take the form, for example, of any one or more of client applications, various services, a gateway connector, a cloud storage gateway, backup media server, and backup storage. Additional, or alternative, applications can likewise be included in the applications 514.

C. Aspects of Some Example Processes

Figure 3:
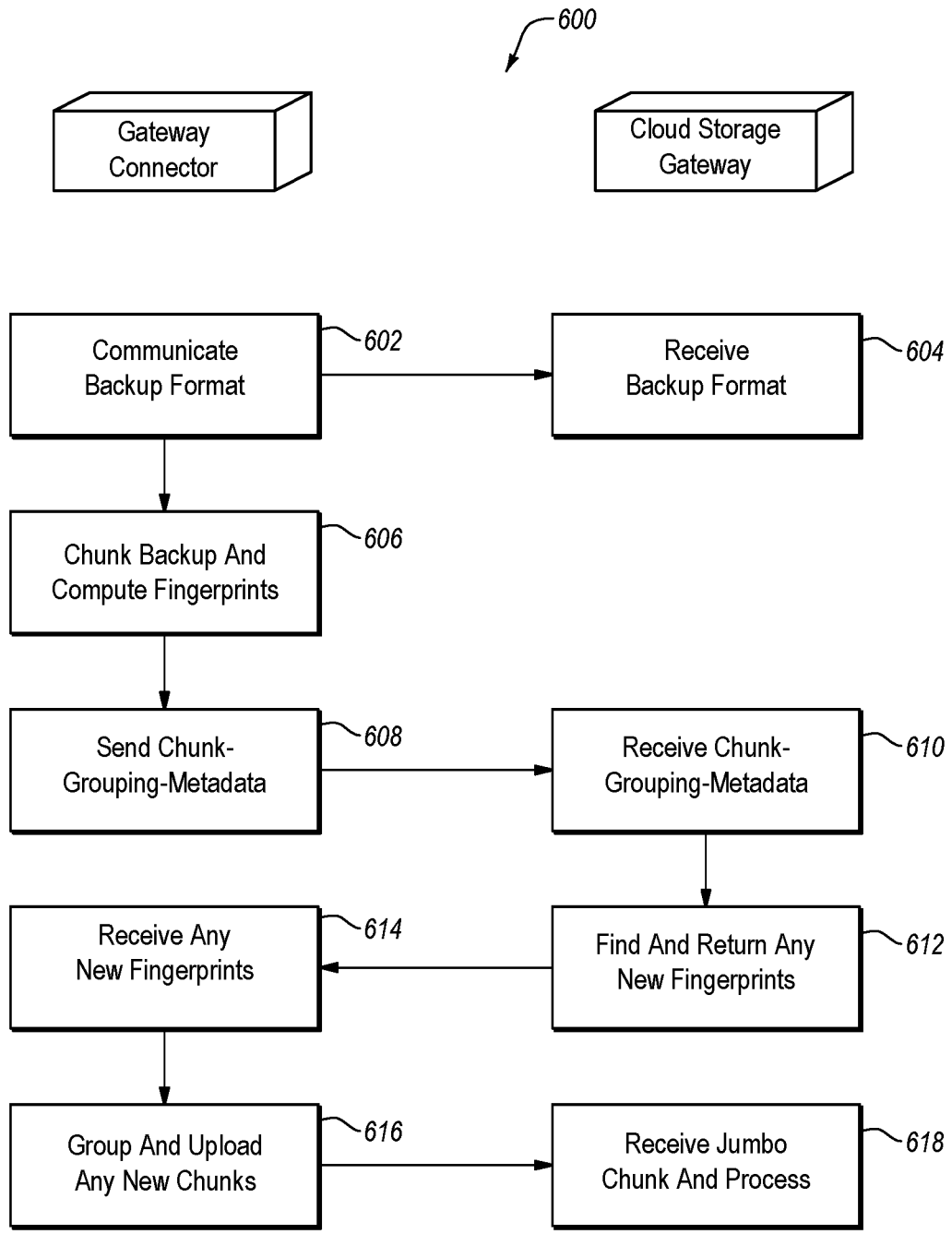
FIG. 3 is a flow diagram directed to aspects of an example method involving replication of data to cloud storage.

With attention now to FIG. 3, details are provided concerning aspects of some example methods, one particular example of which is denoted generally at 600. Part, or all, of the method 600 can be performed by a gateway connector, a cloud storage gateway, or cooperatively by a gateway connector and a cloud storage gateway. In general, the example method 600 concerns replication of backups to a cloud storage platform.

The method 600 can begin when the gateway connector communicates 602 a format of a backup that is to be replicated. The cloud storage gateway then receives 604 the backup format information. Next, the gateway connector 606 chunks the backup to be replicated, and then computes the fingerprints of each chunk. In general, performing a chunk process on data, such as logical data, refers to any process that breaks the data into smaller pieces. As well, a fingerprint refers generally to any metadata that uniquely identifies a particular chunk. In some embodiments, the fingerprint may take the form of a hash of the chunk, although any other fingerprint process or unique identifier could be used.

The gateway connector then sends 608 the chunk-grouping-metadata, and that information is then received 610 by the cloud gateway. It should be noted that the chunkgrouping-metadata can be sent by the gateway connector as a complete file. Alternatively, the chunk-grouping-metadata can be sent as a difference between the current backup and the file for the previous backup, that is, as an incremental backup. It should be noted that the process 608 only transmits metadata to the cloud gateway, and not the chunked data. As used herein, 'chunk-grouping-metadata' refers to metadata that identifies the particular data chunks of a defined grouping of data chunks. This defined grouping can take the form of a full set of data such as may be used for a full backup and/or restore, or can take the form of a difference grouping such as may be used for an incremental backup and/or restore.

After the cloud storage gateway has received 610 the chunk-grouping-metadata from the gateway connector, the cloud storage gateway processes 612 the chunk-grouping-metadata file by looking for any new fingerprints not already present in cloud storage, and then returning a list of any such fingerprints. The process 612 can be performed in response to a backup request from the gateway connector, or from an enterprise backup media server in communication with the gateway connector. New fingerprints may be found, for example, when the cloud storage gateway receives one or more data chunks from the gateway connector that have not previously been stored at the cloud storage platform. The process 600 may end at this juncture if the cloud storage gateway does not identify any new fingerprints.

On the other hand, if one or more new fingerprints are found, a list of any new fingerprints is then received 614 by the gateway connector. In effect, the list received 614 from the cloud storage gateway is a request from the cloud storage gateway that the gateway connector upload only the chunks that correspond to the new fingerprints identified in the list. Thus, the gateway connector groups 616 together all the chunks that correspond to the requested fingerprints, while preserving enough information to identify the boundaries of each chunk, and uploads a jumbo chunk to the cloud-gateway, the jumbo chunk comprising, or consisting of, the data chunks associated with a new fingerprint that appears in the list generated by the cloud storage gateway.

Since only those chunks associated with new fingerprints are uploaded to the cloud storage gateway, the amount of data transmitted from the gateway connector to the cloud storage gateway can be significantly less than if all the backup data were transmitted. Correspondingly, the uploading of all the data chunks together as one single jumbo-chunk can reduce, or eliminate, the need for multiple https connection requests from the gateway connector to the cloud storage provider.

The cloud storage gateway, then receives and processes 618 the jumbo chunk. In particular, the processing 618 of the jumbo chunk at the cloud storage gateway can include, among other things, breaking down of the jumbo chunk into its constituent chunks, and then storing the constituent chunks in storage of the cloud storage platform. The constituent chunks may be stored at the cloud storage platform in association with their respective fingerprints. As noted in the discussion of FIG. 1, the gateway connector device can maintain a cache of all fingerprints that were sent to the cloud storage gateway. This cache can be used to perform an incremental restore operation, since the particular chunk to which each fingerprint respectively corresponds is known.

Figure 4:
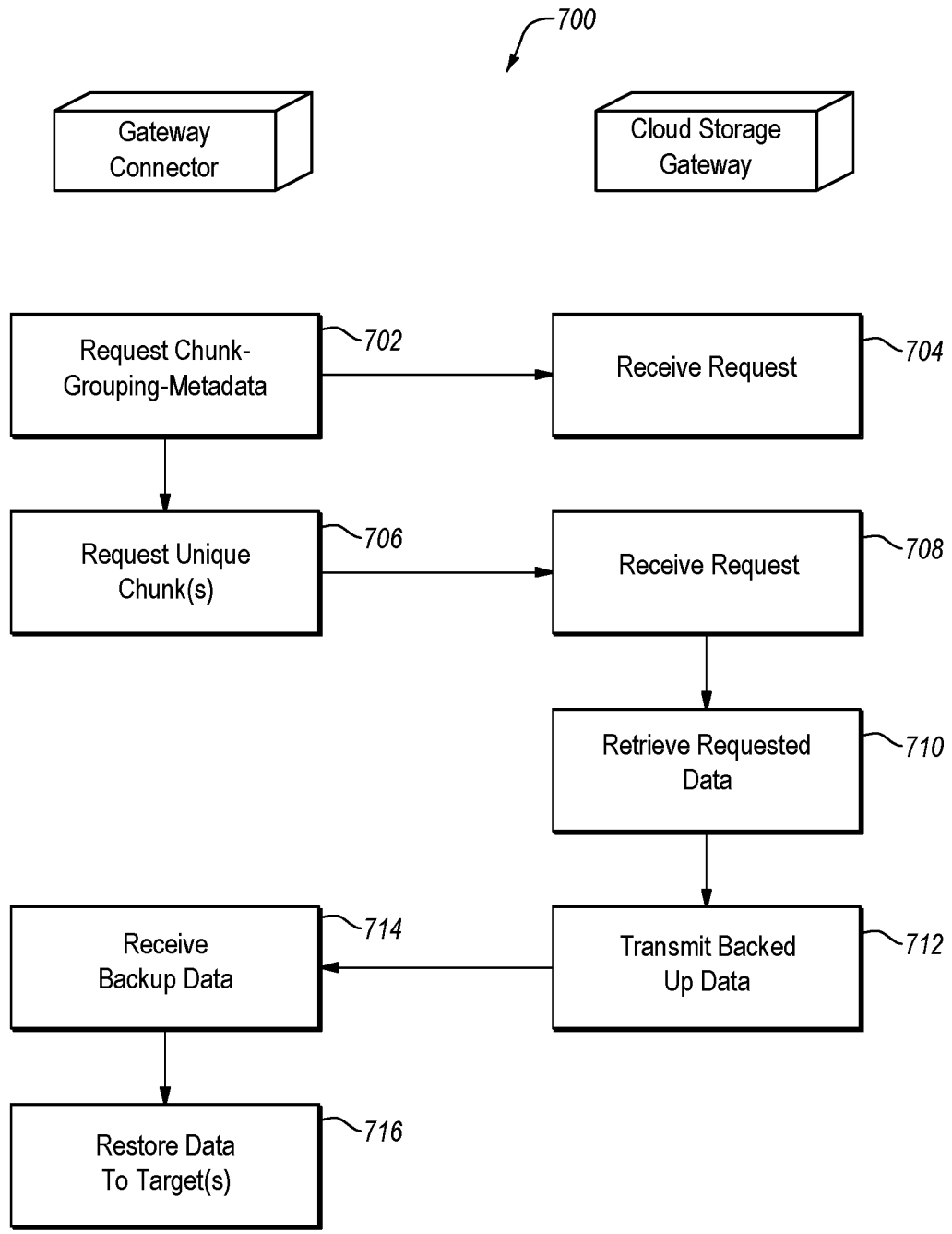
FIG. 4 is a flow diagram directed to aspects of an example method involving replication of data to cloud storage.

With continued reference to FIG. 3, and directing attention now to FIG. 4 as well, one example of such a restore process is denoted generally at 700. The method 700, which can be concerned with restoring a backup, which can be full or incremental, from a cloud storage platform to one or more target devices, such as a client (see FIG. 1) for example, can begin when the gateway connector requests 702 for the chunk-grouping-metadata for the backup to be restored from the cloud storage platform. This request 702 can be passed from the gateway connector to the cloud storage platform by way of the cloud storage gateway. Thus, for example, the request from the gateway connector can be received 704 by the cloud storage gateway.

As part of the request 702, or subsequent to the request 702, the gateway connector can request 706 that the cloud storage gateway retrieve and send each unique chunk to the gateway connector. The unique chunks can, as noted earlier, be identified by their respective fingerprints. The request 706 is received 708 by the cloud storage gateway which then retrieves 710, or directs the retrieval of, the unique chunks identified by the gateway connector. Because the chunks can be stored in the cloud storage platform in association with their respective fingerprints, the request 702 need only specify the fingerprints, and the data storage at the cloud storage gateway can be queried using the fingerprint information.

The data retrieved at the cloud storage platform is then transmitted 712, and received 714 by the gateway connector. In some embodiments at least, the gateway-connector can cache chunks locally if, for example, multiple backups are to be restored from the cloud storage platform. Such local caching of the chunks may help to optimize the number of chunks being read from cloud storage. Finally, the method 700 may end when the received chunks are restored 716 to one or more targets, such as one or more clients (see FIG. 1).

In connection with the methods disclosed in FIGS. 3 and 4, it should be noted that, in some embodiments at least, the chunk-grouping-metadata is always present in cloud storage and that metadata can also be sent as a difference file between the previous backup and the current backup getting replicated to cloud. Such an approach not only facilitates disaster recovery (DR) preparedness of the cloud replicated backups but also cuts down on the time required to send across the chunk-grouping-metadata from the gateway connector to the cloud storage platform.

It should be further noted that a server or other device hosting the gateway connector does not need to scale in terms of CPU, RAM, or local storage based on the amount of backup data stored in the cloud storage platform. As well, the gateway connector is not a single point of failure. That is, loss of the gateway connector does not compromise DR preparedness of the backups replicated to the cloud storage platform.

D. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising
transmitting, from a thin gateway connector at an enterprise premises, backup format information to a storage platform;
breaking data targeted for backup into data chunks, and the backup format information concerns a backup dataset that includes the data;
computing a fingerprint for each of the data chunks;
transmitting, from the thin gateway connector to a cloud storage gateway of the storage platform, chunk grouping metadata concerning the data chunks to the storage platform, wherein the chunk grouping metadata includes the fingerprints and also lists an order of the data chunks;
in response to transmission of the chunk grouping metadata to the cloud storage gateway, receiving, at the thin gateway connector from the storage platform, a list of any new fingerprints not included in the chunk grouping metadata and that do not correspond to any of the data chunks;
in response to receipt of the list from the storage platform, grouping data chunks together to form a single jumbo data chunk, wherein the data chunks that form the jumbo data chunk are only data chunks to which a new fingerprint respectively corresponds; and
transmitting, by the thin gateway connector, the single jumbo data chunk to the cloud storage gateway.

2. The method as recited in claim 1, wherein the method is performed with only a single SSL socket connection between the thin gateway connector and the cloud storage gateway.

3. The method as recited in claim 1, wherein the chunk grouping metadata identifies the data chunks to the cloud storage gateway.

4. The method as recited in claim 1, wherein no data or metadata is persistently stored at the thin gateway connector.

5. The method as recited in claim 1, wherein receipt of the list of new fingerprints received by the thin gateway connector from the cloud storage gateway constitutes receipt of a request from the cloud storage gateway that the thin gateway connector only upload respective data chunks that correspond to the new fingerprints.

6. The method as recited in claim 1, wherein the thin gateway connector forms the single jumbo data chunk.

7. A non-transitory storage medium having stored therein computer-executable instructions which are executable by one or more hardware processors to perform operations comprising:
transmitting, from a thin gateway connector at an enterprise premises, backup format information to a storage platform;
breaking data targeted for backup into data chunks, and the backup format information concerns a backup dataset that includes the data;
computing a fingerprint for each of the data chunks;
transmitting, from the thin gateway connector to a cloud storage gateway of the storage platform, chunk grouping metadata concerning the data chunks to the storage platform, wherein the chunk grouping metadata includes the fingerprints and also lists an order of the data chunks;
in response to transmission of the chunk grouping metadata to the cloud storage gateway, receiving, at the thin gateway connector from the storage platform, a list of any new fingerprints not included in the chunk grouping metadata and that do not correspond to any of the data chunks;
in response to receipt of the list from the storage platform, grouping data chunks together to form a single jumbo data chunk, wherein the data chunks that form the jumbo data chunk are only data chunks to which a new fingerprint respectively corresponds; and transmitting, by the thin gateway connector, the single jumbo data chunk to the cloud storage gateway.

8. The non-transitory storage medium as recited in claim 7, wherein the operations are performed with only a single SSL socket connection between the thin gateway connector and the cloud storage gateway.

9. The non-transitory storage medium as recited in claim 7, wherein the chunk grouping metadata identifies the data chunks to the cloud storage gateway.

10. The non-transitory storage medium as recited in claim 7, wherein receipt of the list of new fingerprints received by the thin gateway connector from the cloud storage gateway constitutes receipt of a request from the cloud storage gateway that the thin gateway connector only upload respective data chunks that correspond to the new fingerprints.

11. The non-transitory storage medium as recited in claim 7, wherein the single jumbo data chunk preserves information enabling the identification of boundaries for the data chunks.

12. The non-transitory storage medium as recited in claim 7, wherein no data or metadata is persistently stored at the thin gateway connector.

13. The non-transitory storage medium as recited in claim 7, wherein the thin gateway connector forms the single jumbo data chunk.

14. A system, comprising:
one or more hardware processors; and
a non-transitory storage medium having stored therein computer-executable instructions which are executable by the one or more hardware processors to perform operations comprising:
transmitting, from a thin gateway connector at an enterprise premises, backup format information to a storage platform;
breaking data targeted for backup into data chunks, and the backup format information concerns a backup dataset that includes the data;
computing a fingerprint for each of the data chunks;

transmitting, from the thin gateway connector to a cloud storage gateway of the storage platform, chunk grouping metadata concerning the data chunks to the storage platform, wherein the chunk grouping metadata includes the finger prints and also lists an order of the data chunks;

in response to transmission of the chunk grouping metadata to the cloud storage gateway, receiving, at the thin gateway connector from the storage platform, a list of any new fingerprints not included in the chunk grouping metadata and that do not correspond to any of the data chunks;

in response to receipt of the list from the storage platform, grouping data chunks together to form a single jumbo data chunk, wherein the data chunks that form the jumbo data chunk are only data chunks to which a new fingerprint respectively corresponds; and transmitting, by the thin gateway connector, the single jumbo data chunk to the cloud storage gateway.

15. The system as recited in claim 14, wherein the operations are performed with only a single SSL socket connection between the thin gateway connector and the cloud storage gateway.

16. The system as recited in claim 14, wherein the chunk grouping metadata identifies the data chunks to the cloud storage gateway.

17. The system as recited in claim 14, wherein receipt of the list of new fingerprints received by the thin gateway connector from the cloud storage gateway constitutes receipt of a request from the cloud storage gateway that the thin gateway connector only upload respective data chunks that correspond to the new fingerprints.

18. The system as recited in claim 14, wherein the single jumbo data chunk preserves information enabling the identification of boundaries for the data chunks.

19. The system as recited in claim 14, wherein no data or metadata is persistently stored at the thin gateway connector.

20. The system as recited in claim 14, wherein the thin gateway connector forms the single jumbo data chunk.

* * * * *